United States Patent
Konshak

(10) Patent No.: US 7,088,579 B1
(45) Date of Patent: Aug. 8, 2006

(54) SMALL FORM FACTOR DISK DRIVE CARRIER

(75) Inventor: Michael V. Konshak, Louisville, CO (US)

(73) Assignee: Storage Technology Corporation, Louisville, CO (US)

( * ) Notice: Subject to any disclaimer, the term of this patent is extended or adjusted under 35 U.S.C. 154(b) by 227 days.

(21) Appl. No.: 10/712,540

(22) Filed: Nov. 13, 2003

(51) Int. Cl.
*G06F 1/16* (2006.01)
(52) U.S. Cl. ........................................ 361/685
(58) Field of Classification Search ............ 361/685
See application file for complete search history.

(56) References Cited

U.S. PATENT DOCUMENTS

| | | | |
|---|---|---|---|
| 5,136,466 A | 8/1992 | Remise et al. | |
| 5,262,923 A | 11/1993 | Batta et al. | |
| 5,734,557 A | 3/1998 | McAnally et al. | |
| 5,921,644 A * | 7/1999 | Brunel et al. | 312/223.2 |
| 5,978,212 A | 11/1999 | Boulay et al. | |
| 6,064,569 A * | 5/2000 | Sands et al. | 361/685 |
| 6,249,432 B1 | 6/2001 | Gamble et al. | |
| 6,297,954 B1 | 10/2001 | Seo | |
| 6,480,391 B1 | 11/2002 | Monson et al. | |
| 6,483,107 B1 | 11/2002 | Rabinovitz et al. | |
| 6,560,098 B1 | 5/2003 | Beinor, Jr. | |
| 6,608,750 B1 * | 8/2003 | Cruz et al. | 361/685 |

* cited by examiner

*Primary Examiner*—Yean-Hsi Chang
(74) *Attorney, Agent, or Firm*—Brooks Kushman P.C.

(57) ABSTRACT

A multiple disk drive storage apparatus that receives a plurality of removable disk drive modules. The removable disk drive modules comprise a disk drive and a carrier body. The carrier body is molded in one piece and may have a latch, an ejection spring, a light pipe, and a cavity for receiving the disk drive. The disk drive is retained in the cavity with a snap-fit connection.

14 Claims, 5 Drawing Sheets

US 7,088,579 B1

SMALL FORM FACTOR DISK DRIVE CARRIER

BACKGROUND OF THE INVENTION

1. Field of the Invention

The present invention relate to a combination of a multiple disk drive storage apparatus having a plurality of removable disk drive modules.

2. Background Art

Computer systems are used to collect, analyze, and store data. Multiple disk drive storage systems are used to store vast amounts of data. Removable disk drives have been developed for such systems to allow large amounts of data to be easily transferred between computers. Recently, smaller disk drives have been developed that have greater storage capabilities that are called small form factor (SFF) drives. SFF drives are normally used in applications where the size of components is critical, for example in a laptop computer. Multiple disk drive storage systems, or disk drive array systems, are currently under development that utilize SFF drives because of their relatively low cost and general availability.

Removable disk drive storage systems may be designed to allow an operator to replace corrupt or defective disk drives. Guides and railings may be attached to an outer case of the disk drive with fasteners or screws. The guides and railings are required to align the disk drive with a slot for insertion into the disk drive storage system.

Some disk drives may incorporate a carrier to receive the disk drive. The combination of the disk drive and the carrier is called a disk drive module. The carrier can be a frame-like or tray-like structure that is attached to the disk drive with fasteners or screws. Such carriers may include a large number of component parts, such as rails, guides, and handles. Screws or other fasteners are generally used to assemble the component parts and disk drives to the carrier.

An operator generally removes the disk drive module from the disk drive storage system by pulling the disk drive module out of the slot against the retentive force of a multi-pin connector. Conventional carriers do not generally provide a simple mechanism for removing the disk drive module from the disk drive storage system.

A need exists for a cost effective disk drive carrier that is simple to manufacture. There is also a need for a disk drive carrier that integrates components like ejection springs, latches, and light pipes without burdensome assembly processes. There is also a need for a disk drive carrier that is adapted to receive and secure SFF disk drives, and the like, without fasteners or screws. There is a further need for a disk drive carrier that facilitates removing the disk drive module from the disk drive storage system.

SUMMARY OF THE INVENTION

The present invention fulfils the need for a one piece molded carrier that is particularly suitable for SFF drives but that may also be adapted to other types of drives. The carrier may have one or more improved features such as a snap-in disk drive, an ejection spring, a latch, and a light pipe system.

One embodiment of the present invention provides a combination of a multiple disk drive storage apparatus and a plurality of removable disk drive modules. The disk drive storage apparatus includes a housing having an opening in a front side that is further divided into a plurality of slots. A motherboard is connected to the multiple disk drive storage apparatus and is disposed within the housing. The disk drive module further comprises a disk drive and a carrier body that has a cavity for receiving the disk drive. Each of the disk drive modules is received in one of the slots of the housing. Each of the disk drive modules comprises a disk drive having a first connector that is received by a second connector of the motherboard when the disk drive module is placed in the slot. The carrier body has a front portion and a rear portion. The front portion is disposed in the opening in the front side of the housing and the rear portion is disposed within the housing when the disk drive module is placed in one of the slots. A latch is integrally formed on the carrier body to engage the housing and is accessible from the front side of the housing. An ejection spring is integrally formed on the carrier body and engages a member disposed within the housing. The ejection spring exerts a biasing force on the member to disconnect the first connector from the second connector and also pushes the disk drive module out of the housing through the opening in the front side of the housing. The disk drive module may be easily removed with the assistance of the ejection spring by simply disengaging the latch from the housing.

In another embodiment of the invention, the carrier body may further comprise a light pipe integrally formed on the carrier body. The light pipe extends from the rear portion of the carrier body to the front portion of the carrier body. The light pipe aligns with a status light that is provided on the motherboard. The light pipe transmits light from the status light to the front portion of the carrier body when the disk drive module is placed in the slot.

According to another aspect of the invention, the cavity of the carrier body is defined by a side wall, a front wall, a rear wall, a top wall and a bottom wall. The cavity receives the disk drive and is retained by a snap-fit connection between the cavity and the disk drive.

The above aspects, features, and advantages of the present invention will be readily apparent from the following detailed description of the preferred embodiments when taken in view of the drawings.

DETAILED DESCRIPTION OF THE PREFERRED EMBODIMENT(S)

Figure 1:
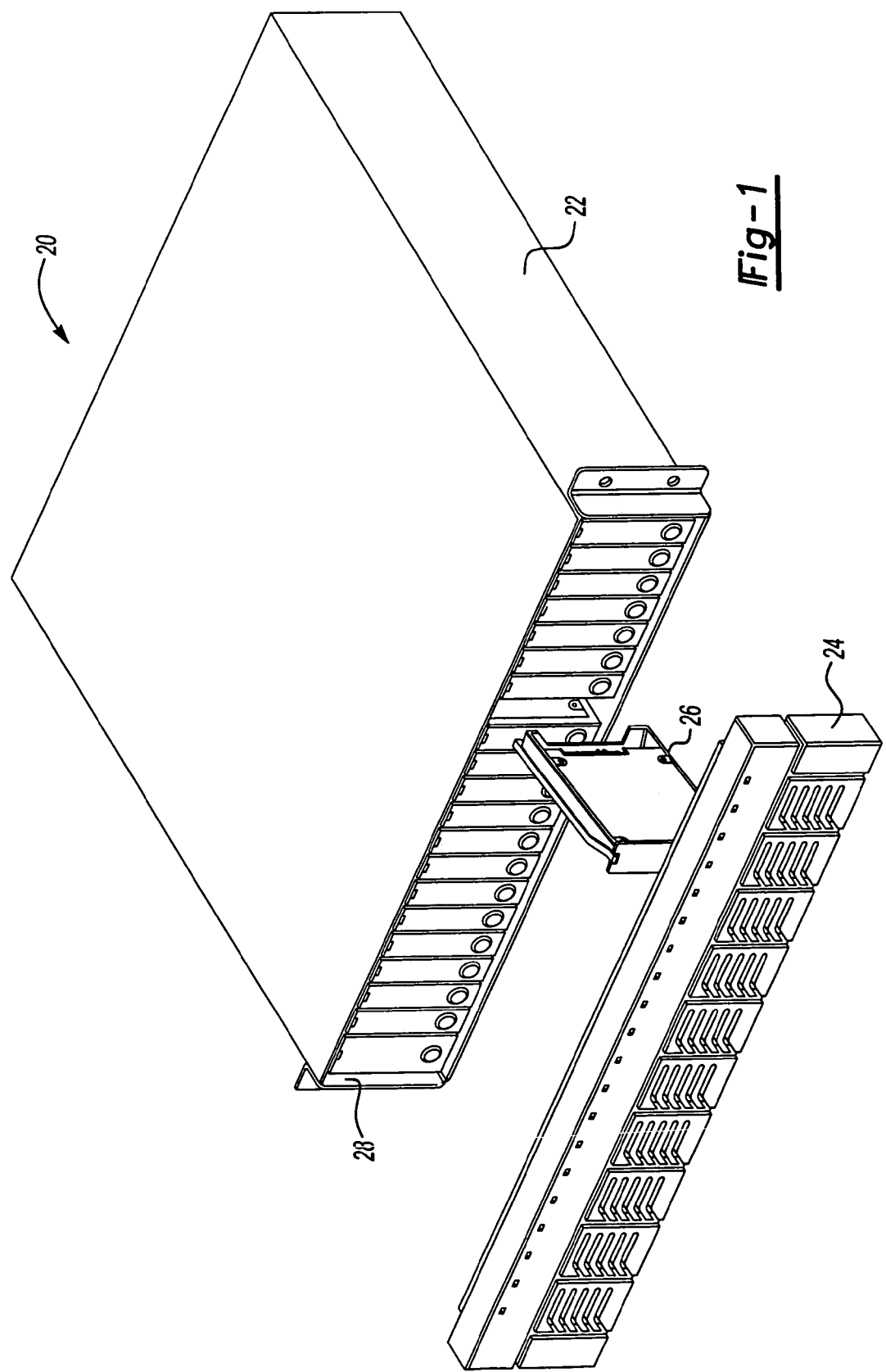
FIG. 1 is a perspective view of a multiple disk drive storage array apparatus that is made according to one embodiment of the present invention.

FIG. 1 illustrates a multiple disk drive storage apparatus 20. The multiple disk drive storage apparatus 20 includes a housing 22, a cover 24, and a plurality of disk drive modules 26. A plurality of the multiple disk drive storage apparatuses 20 may be vertically or horizontally stacked in a disk drive array system housing (not shown).

Figure 2:
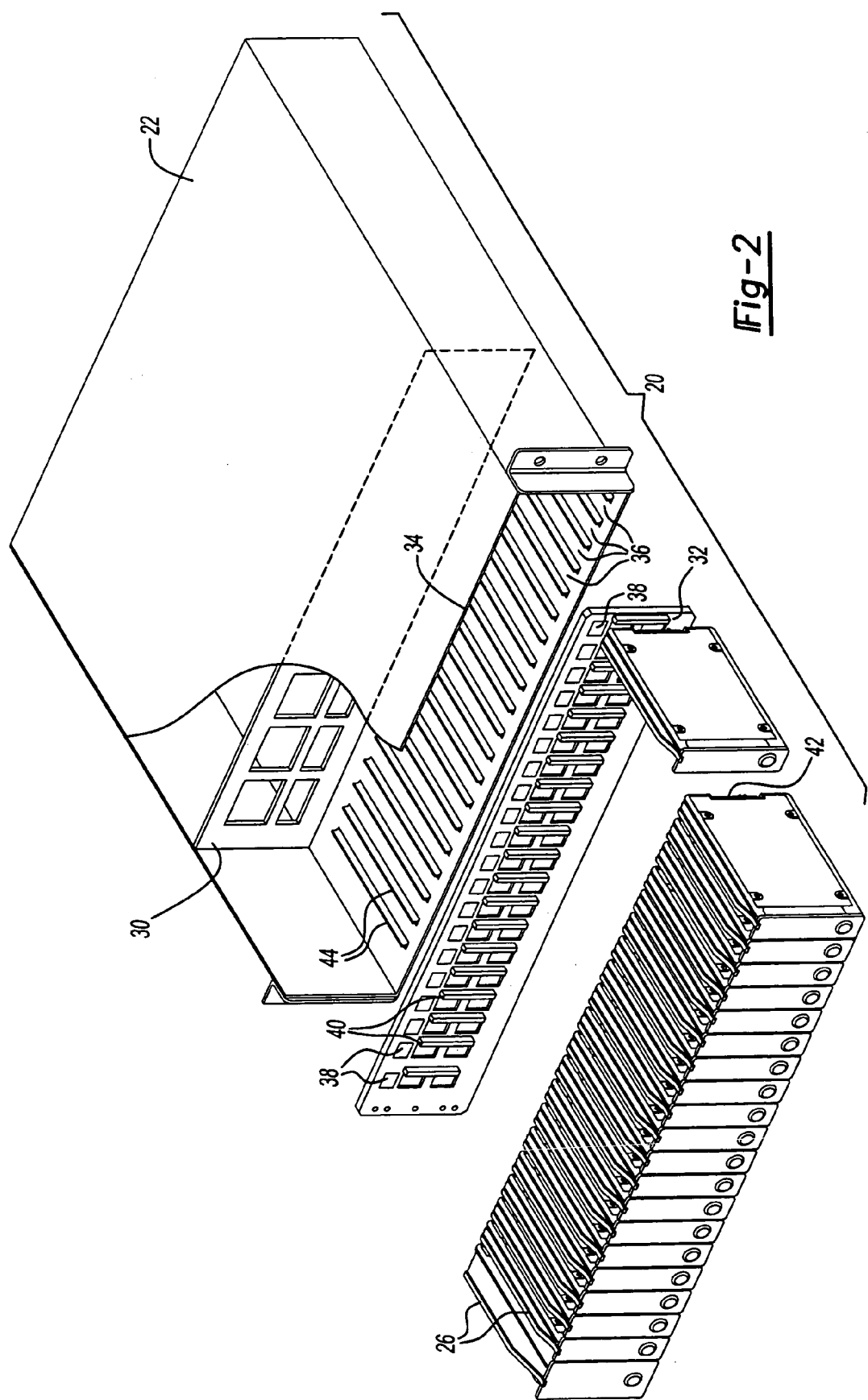
FIG. 2 is an exploded perspective view of the multiple disk drive storage array apparatus with an array of disk drive modules.

FIG. 2 provides additional details in an exploded view of the multiple disk drive storage array apparatus 20. The housing 22 encloses a rigid member 30 and a motherboard 32. The rigid member 30 provides support for the motherboard 32 within the housing 22. The housing 22 has an opening 34 and defines a plurality of slots 36. Each disk drive module 26 may be individually and selectively inserted into and removed from one of the slots 36.

The motherboard 32 receives the disk drive modules 26 when they are inserted into the slots 36. The motherboard 32 may be connected to other computer components of the disk drive system housed within the disk drive housing 22. The motherboard 32 includes a plurality of status lights 38 and a plurality of connectors 40 that connect the drives to other computer components. Each connector 40 may be connected to a corresponding connector 42 provided on the disk drive module 26.

The disk drive modules 26 are aligned side-by-side within the slots 36. Each slot 36 includes at least one divider 44 that guides the disk drive modules 26 into the slot 36. Dividers 44 separate and prevent contact between adjacent disk drive modules 26.

Figure 3:
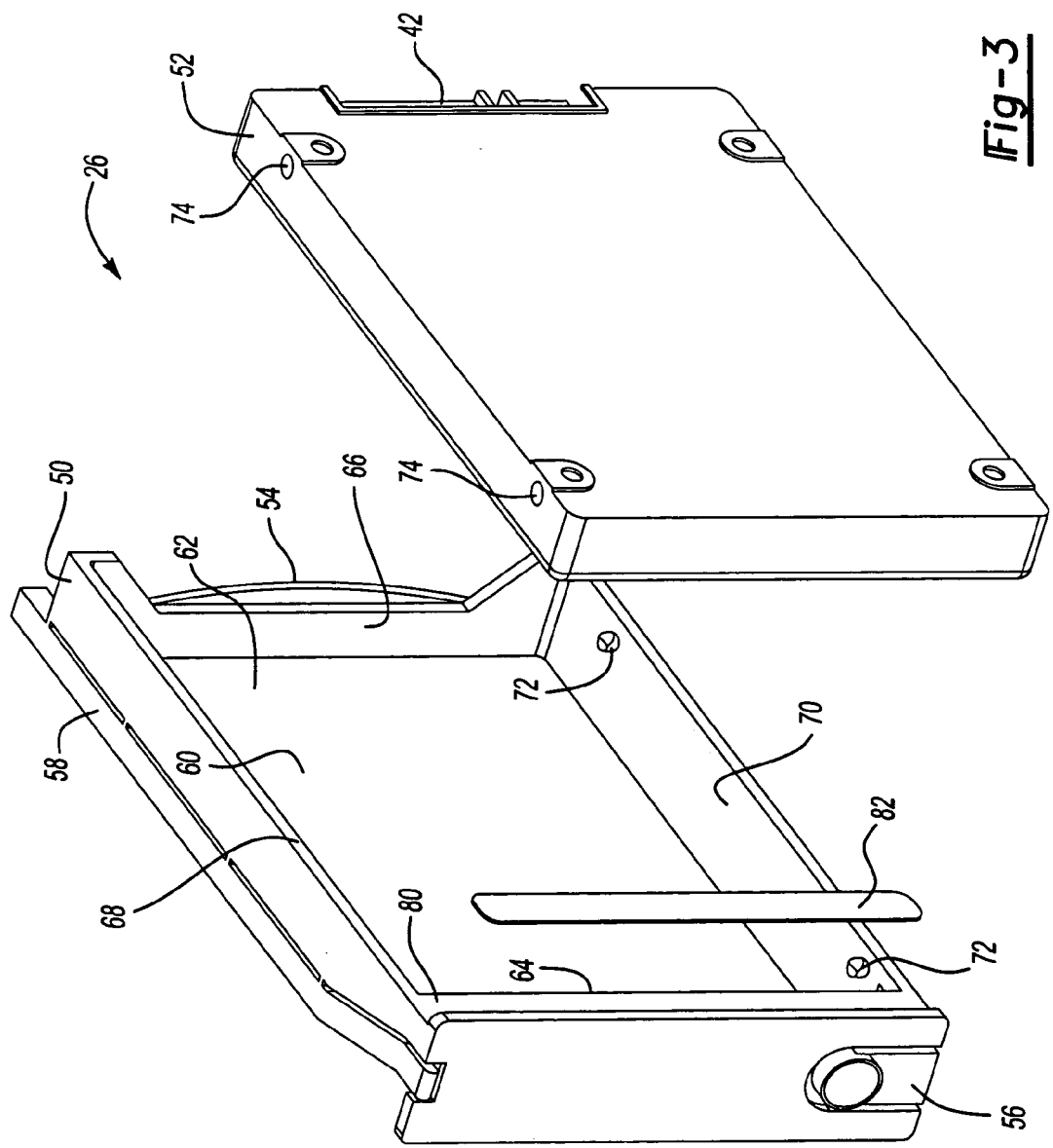
FIG. 3 is a front side exploded perspective view of a disk drive module.

FIG. 3 illustrates the further features of the disk drive module 26. Each disk drive module 26 includes a carrier 50 and a disk drive 52. The carrier 50 may include an ejection spring 54, a latch 56, a light pipe 58, and a cavity 60.

The cavity 60 receives the disk drive 52. The cavity 60 is defined by a side wall 62, a front wall 64, a rear wall 66, a top wall 68, and a bottom wall 70. The cavity 60 includes at least one snap-fit protrusion 72. A plurality of protrusions 72 are located within the cavity on the top wall 68 and the bottom wall 70 of the cavity 60. The protrusions 72 are received in a plurality of corresponding recesses 74 that are provided in the disk drive 52. The top wall 68 and bottom wall 70 support the protrusions 72 and may flex to accommodate the insertion and removal of the disk drive 52 from the cavity 60. The shear strength of the snap-fit between the protrusions 72 and the recesses 74 must be low enough to permit insertion and the removal of the disk drive 52 in the cavity 60, but must be sufficient to resist becoming dislodged when the disk drive module 26 is inserted into or removed from the storage apparatus 20.

The cavity 60 receives the disk drive 52. The protrusion 62 is received in the corresponding recess 64 of the disk drive 52. The disk drive 52 forms a snap-fit with the cavity 60. The term "snap-fit" is intended to mean an interference fit between the disk drive 52 and cavity 60 or any other type of connection that does not require tools to secure the disk drive 52 in the carrier 50. The disk drive 52 is retained within the cavity 60 when the disk drive module 26 is inserted into and is removed from the slot 36.

The light pipe 58 extends from the rear portion of the carrier 50 to the front portion of the carrier. The light pipe 58 is aligned with the status light 38 of the motherboard 32. The light pipe 58 transmits light from the status light 38 to the front portion of the carrier 50 to make the status light visible to an operator.

The carrier 50 may be molded from an optically clear polycarbonate polymer. The polycarbonate polymer is selected based upon desired material characteristics such as flexibility, elasticity and translucency. LEXAN® 241-111 N is one polycarbonate polymer that may be used to mold the carrier.

The disk drive module 26 may further include a front surface 78. The front surface 78 attaches to the outer front wall 64 of the carrier 50. The front surface 78 may seal the array of disk modules 26 for air flow retention. The front surface 78 may also include a decorative overlay to provide a desired opaque appearance even though the carrier 50 is formed from a transparent polymer. An edge 80 of the front wall 64 may be provided with an information overlay 82. The information overlay 82 may be a bar code label with volume identification and serial numbers.

Figure 4:
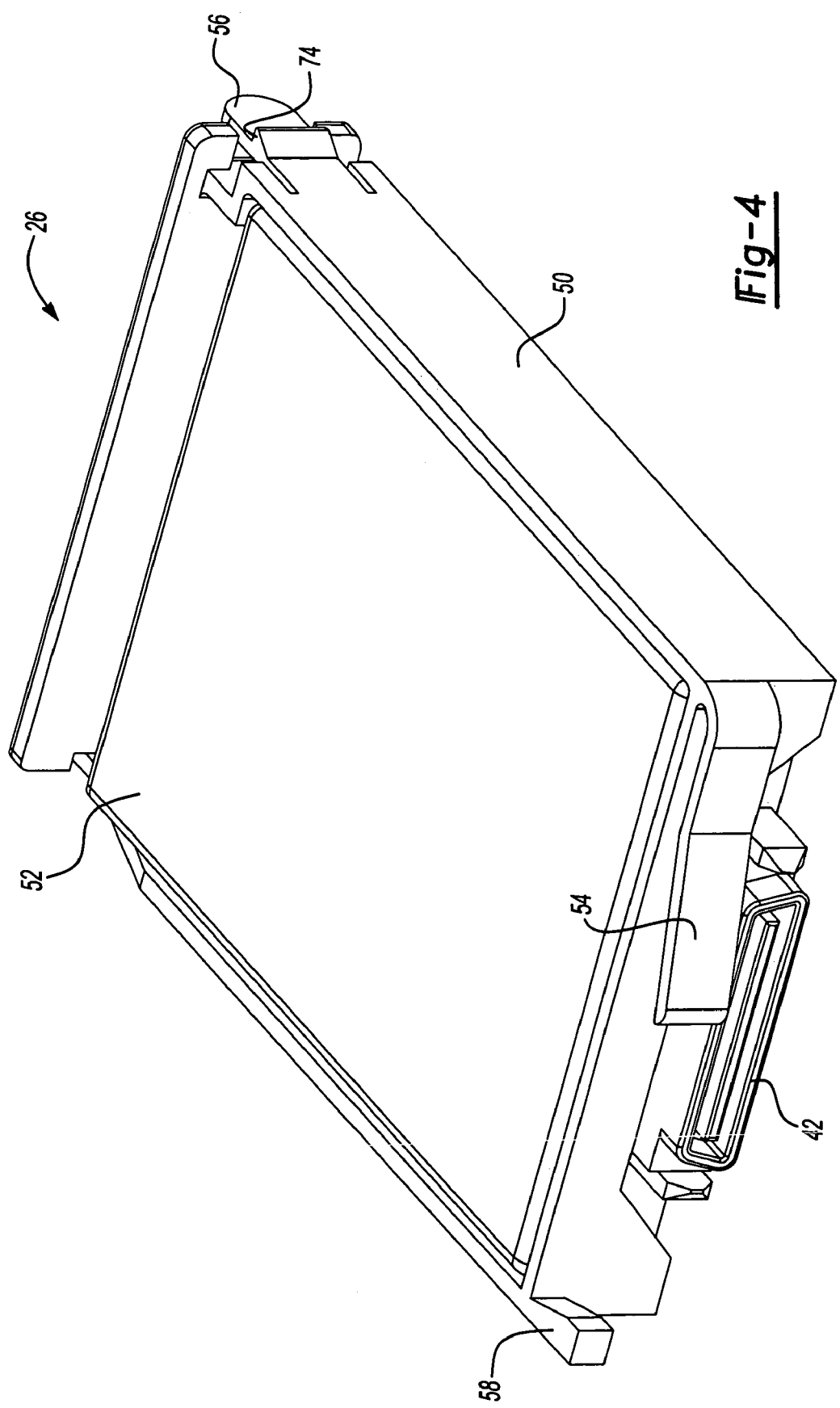
FIG. 4 is a rear perspective view of the disk drive module.

FIG. 4 provides a rear perspective view of the disk drive module 26 showing the ejection spring 54 and the latch 56. The ejection spring 54 is generally located in the rear portion of the disk drive module 26. However, the ejection spring 54 may be located in many different locations, such as on the top, bottom or side of the carrier 50. The ejection spring 54 is integrally molded as part of the carrier 50. When the disk drive module 26 is fully inserted into the storage apparatus 20, the ejection spring 54 exerts a biasing force on the latch 56 to hold the carrier 50 in the slot 36. The latch 56 is located near the front portion of the carrier 50. The latch 56 is released by either pressing the latch to lift a tab 84 or lifting the latch to unseat the tab from the slot 36. When the latch 56 is released, the ejection spring 54 provides an ejection force that is sufficient to overcome the retentive force between the motherboard connector 40 and the disk drive connector 42. The ejection spring 54 may engage either the rigid member 30 or the motherboard 32 to eject the carrier 50 from the disk array housing 22.

The ejection spring 54 also provides an ejection force to partially eject the disk drive module 26 from the slot 36. The disk drive module 26 is partially ejected to provide a purchase for the user to grasp and remove the disk drive module 26 from the disk drive storage apparatus 20.

Figure 5:
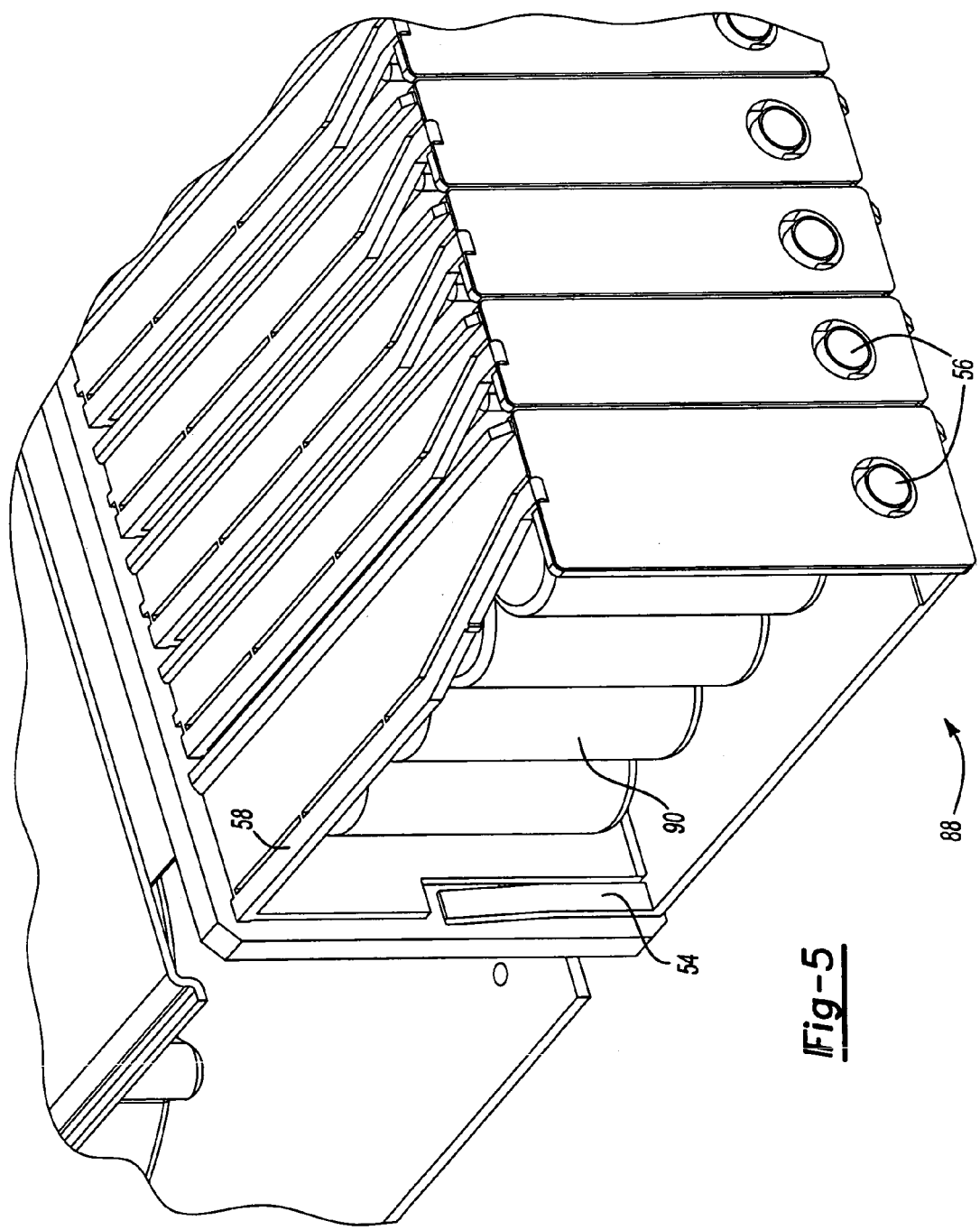
FIG. 5 is a fragmentary exploded perspective view of an array of disk drive modules and a modified carrier that is adapted to house a power source.

FIG. 5 illustrates an alternative carrier 88 made in accordance with an alternative embodiment of the present invention in which the cavity is adapted to receive a power source 90. Power source 90 may provide a backup power source for the array. The carrier 88 may be wider than the disk drive carrier 50 to provide additional space for the power source 90. The power source 90 preferably includes a connector (not shown) for connecting the power source to the motherboard 32 and the multiple disk drive storage apparatus 20.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A combination of a multiple disk drive storage apparatus and a plurality of removable disk drive modules, the disk drive storage apparatus includes a housing having an opening in a front side that is further divided into a plurality of slots and a motherboard disposed within the housing, each of the disk drive modules is received in one of the slots of the housing, wherein each of the disk drive modules comprises:

a disk drive having a first connector that is received by a second connector of the motherboard when the disk drive module is placed in the slot;

a carrier body with a front portion and a rear portion, the front portion being disposed in the opening in the front side of the housing and the rear portion being disposed within the housing when the disk drive module is placed in one of the slots, a latch integrally formed on the carrier body that engages the housing and is accessible from the front side of the housing, the carrier body having an integrally formed ejection spring that engages a member disposed within the housing; and wherein the disk drive module may be removed by disengaging the latch from the housing, the ejection spring exerting a biasing force on the member disconnecting the first connector from the second connector and urging the disk drive module out of the housing through the opening in the front side of the housing.

2. The combination of claim 1 wherein the disk drive is a small form factor disk drive.

3. The combination of claim 1 wherein the ejection spring is disposed proximate the rear portion of the carrier body.

4. The combination of claim 1 wherein the member is a portion of the motherboard.

5. The combination of claim 1, wherein the carrier body further comprises a front wall that spans at least a portion of the opening in the front side of the housing, wherein the front wall restricts the flow of air through the opening and seals the multiple disk drive storage apparatus for air flow retention.

6. The combination of claim 1, wherein the carrier body further comprises a side wall having a surface for receiving an informational overlay.

7. The combination of claim 1, wherein the carrier body further comprises:

a light pipe integrally formed on the carrier body, the light pipe extending from the rear portion of the carrier body to the front portion of the carrier body;

the motherboard having at least one status light, the light pipe being aligned with the status light; and wherein the light pipe transmits light from the status light to the front portion of the carrier body when the disk drive module is placed in the slot.

8. The combination of claim 1 wherein the carrier is molded in one piece.

9. The combination of claim 1 wherein the carrier is molded from a polycarbonate polymer.

10. The combination of claim 1 further comprising a power source for supplying power to the multiple disk drive storage apparatus, wherein the power source is disposed in a modified carrier and is removable from the housing in the same manner as one of the disk drive modules.

11. A disk drive module that is received in a multiple disk drive storage apparatus, the disk drive module comprising:

a disk drive;

a carrier body having an open sided cavity defined by the carrier body, the disk drive being secured within the cavity, the carrier body having an integrally formed ejection spring that exerts a biasing force relative to the multiple disk drive storage apparatus for disconnecting the disk drive from the multiple disk drive storage apparatus; and wherein the carrier and the disk drive have first and second cooperating surface features that create a snap-fit to retain the disk drive in the cavity.

12. The disk drive module of claim 11, the disk drive has an outer case, and wherein the first surface feature is at least one recess formed in the outer case, the carrier body providing the second surface feature, wherein the second surface feature is at least one protrusion; and wherein each one of the protrusions is received in one of the recesses.

13. The disk drive module of claim 12, wherein the recess is a threaded hole.

14. The disk drive module of claim 11, wherein the carrier body flexes as the protrusion is inserted into the recess and as the protrusion is removed from the recess.

* * * * *